(12) United States Patent
Shuster (10) Patent No.: US 9,672,375 B2
(45) Date of Patent: *Jun. 6, 2017

(54) SECURITY KEY ENTRY USING ANCILLARY INPUT DEVICE

(71) Applicant: Gary Stephen Shuster, Fresno, CA (US)

(72) Inventor: Gary Stephen Shuster, Fresno, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/610,192

(22) Filed: Jan. 30, 2015

(65) Prior Publication Data

US 2015/0143166 A1    May 21, 2015

Related U.S. Application Data

(63) Continuation of application No. 13/218,333, filed on Aug. 25, 2011, now Pat. No. 8,949,964.

(Continued)

(51) Int. Cl.
| | |
|---|---|
| *G06F 21/00* | (2013.01) |
| *H04L 29/06* | (2006.01) |
| *G06F 21/62* | (2013.01) |
| *G06F 3/0354* | (2013.01) |
| *G06F 21/31* | (2013.01) |
| *G06F 11/07* | (2006.01) |
| *G11B 20/12* | (2006.01) |

(Continued)

(52) U.S. Cl.
CPC ...... *G06F 21/6218* (2013.01); *G06F 3/03543* (2013.01); *G06F 11/073* (2013.01); *G06F 11/0793* (2013.01); *G06F 21/31* (2013.01)

(58) Field of Classification Search
CPC .............. G06F 21/6218; G06F 11/073; G06F 11/0793; G06F 3/03543; G06F 21/31
See application file for complete search history.

(56) References Cited

U.S. PATENT DOCUMENTS

| 4,479,112 A | 10/1984 | Hirsch |
| 5,319,735 A | 6/1994 | Preuss et al. |

(Continued)

FOREIGN PATENT DOCUMENTS

| FR | 2612234 A | 9/1988 |
| JP | 04353673 A * | 12/1992 |

OTHER PUBLICATIONS

Ricardo Jorge Santos, Jorge Bernardino, Marco Vieira; "A data masking technique for data warehouses"; Sep. 2011; IDEAS '11: Proceedings of the 15th Symposium on International Database Engineering & Applications; Publisher: ACM; pp. 61-69.*

(Continued)

*Primary Examiner* — David Garcia Cervetti
*Assistant Examiner* — Courtney Fields
(74) *Attorney, Agent, or Firm* — Coleman & Horowitt, LLP; Sherrie Flynn (57) ABSTRACT

A physical, non-human readable representation of a digital key may be in a physical key article. The key article may enable a person to generate a signal representing the digital key from a user interface device in communication with a computer by physical manipulation of the key article. Access to digital content via the computer may be unlocked in response to receiving the signal. In addition, a key may be represented by a pattern of unreadable errors in a computer-readable medium.

20 Claims, 3 Drawing Sheets

Related U.S. Application Data (60) Provisional application No. 61/376,844, filed on Aug. 25, 2010.

(51) Int. Cl.
*G11B 20/18* (2006.01)
*G08B 29/00* (2006.01)

(56) References Cited

U.S. PATENT DOCUMENTS

| | | | |
|---|---|---|---|
| 6,055,592 A | 4/2000 | Smith | |
| 6,480,960 B1 | 11/2002 | Gotoh et al. | |
| 6,542,927 B2 | 4/2003 | Rhoads | |
| 6,973,576 B2 | 12/2005 | Giobbi | |
| 7,111,324 B2 | 9/2006 | Elteto et al. | |
| 7,174,568 B2 | 2/2007 | Chatani et al. | |
| 7,222,240 B2 | 5/2007 | Elteto | |
| 7,260,726 B1 | 8/2007 | Doe et al. | |
| 7,263,606 B2 | 8/2007 | Elteto | |
| 7,269,844 B2 | 9/2007 | Elteto et al. | |
| 7,305,560 B2 | 12/2007 | Giobbi | |
| 7,337,323 B2 | 2/2008 | Cochran et al. | |
| 7,584,512 B2 | 9/2009 | Feinleib et al. | |
| 2002/0016816 A1 | 2/2002 | Rhoads | |
| 2003/0152222 A1* | 8/2003 | Nakano | G06F 21/10 380/201 |
| 2004/0156613 A1 | 8/2004 | Hempel et al. | |
| 2004/0193949 A1* | 9/2004 | Hirotsune | G11B 7/007 714/6.12 |
| 2006/0059366 A1 | 3/2006 | Feinleib et al. | |
| 2006/0255913 A1 | 11/2006 | Yoshino | |
| 2007/0179896 A1 | 8/2007 | Elteto et al. | |
| 2007/0208805 A1 | 9/2007 | Rhoads et al. | |
| 2008/0040609 A1 | 2/2008 | Giobbi | |
| 2009/0193511 A1 | 7/2009 | Noe et al. | |
| 2010/0025470 A1* | 2/2010 | Nakagawa | G06K 7/14 235/462.01 |

OTHER PUBLICATIONS

Tysowski, P.K. ; Hasan, M.A.; "Hybrid Attribute- and Re-Encryption-Based Key Management for Secure and Scalable Mobile Applications in Clouds"; Cloud Computing, IEEE Transactions on vol. 1 , Issue: 2; DOI: 10.11 09/ TCC.2013.11; Publication Year: Jul. 2013, pp. 172-186.

* cited by examiner

SECURITY KEY ENTRY USING ANCILLARY INPUT DEVICE

CROSS-REFERENCE TO RELATED APPLICATION

This application is a continuation of U.S. application Ser. No. 13/218,333 filed Aug. 25, 2011, now U.S. Pat. No. 8,949,964, which claims priority pursuant to 35 U.S.C. §119(e) to U.S. provisional application Ser. No. 61/376,844, filed Aug. 25, 2010, which applications are incorporated by reference herein.

BACKGROUND

1. Field

The present disclosure relates to communication of encoded data to a computer via a user interface device, wherein the data comprises a security key that is not encoded in a computer-readable medium.

2. Description of Related Art

The entry of serial numbers into computers, computer games, mobile phone and similar products is often used for unlocking software, subscription services, user accounts, virtual cash, or the other products accessed via a computing environment. For example, to register and use a software product, the user may be required to enter a multi-character key (sometimes called a "serial number") received on printed media or via an electronic message, using a character entry device such as a keyboard or simulated keyboard. As the use of serial numbers for different applications has proliferated and their length has increased, entry of serial numbers has become increasingly difficult and troublesome for end users. Problems include character discrimination errors, for example, perceiving the letter "O" as the number "0" or perceiving the number "1" as the lowercase letter "L". Another problem is that written serial numbers are not accessible to the visually impaired, and therefore the end user needs to have a certain level of visual acuity or must obtain a magnifying device or assistance from another person. Another problem is that the length and complexity of serial numbers leads to errors in entering the numbers, or is simply inconvenient. Another problem is that users may be confused about the entry of spaces or tab characters within a serial number, for example, some programs with numbers in the format xxxx-xxxx-xxxx advance the cursor automatically to the next field of four when the first four characters are entered, but the user does not realize this and types a tab or space as the first character of the next field of four. Another problem is that printing the serial number may result in the serial number being unintentionally redistributed.

It may be desirable, therefore, to overcome these and other limitations of the prior art with novel methods, apparatus, and systems for distributing and entering security keys using a user interface device or input device, and a computer for receiving the key.

SUMMARY

Novel methods, system, and apparatus are disclosed herein to facilitate the entry of fixed information, for example a digital key, into a computing device. As used herein, a "digital key" should be understood as encompassing binary data or non-binary character strings (for example, serial numbers, passwords, pass phrases, and pass codes) that are converted to, or interpreted as, binary data for application and use with a digital computer. Although the disclosed examples concern security keys, it should be appreciated that the examples may be adapted to any application required entry of predetermined information into a computing device as part of an interaction between a human being and the computing device. The examples provided in the following summary are intended to summarize selected aspects of the present technology, and do not encompass all inventive aspects disclosed herein, some of which are presented solely in the detailed description. Accordingly, the summary below should be understood as illustrative of aspects of the disclosure, but not as necessarily limiting or excluding further novel aspects of the disclosure presented in the detailed description.

An aspect of the disclosure concerns a method for enabling entry of a digital key into a computer. As used herein, a computer means a programmable computing machine based on an electronic digital processor, and excludes non-machine or natural computers. For example, a computer may comprise a personal computer, a notebook computer, a Blu-ray® or similar optical media player, a set-top box, a smart phone, a smart television, or other processor-enabled device. The method may include configuring a physical, non-human readable representation of a digital key in a physical key article. As used herein, "configuring" means specifying at least one essential physical parameter that is sufficient to define the representation of the digital key when embodied in the key article. The physical key article may be configured so as to enable a person to generate a signal representing the digital key from a user interface device in communication with a computer by physical manipulation of the key article. As used herein, "physical manipulation" means handling, specific examples of which are provided below, and a "user interface device" means a keyboard, a touchscreen, a key pad, a microphone, a pointing device, an optical scanner, or any other electro-mechanical device that receives an input generated by physical actions of a human being (e.g., typing, speaking, moving an optical mouse) and converts the input into a digital signal encoded in a computer-readable medium.

In an aspect of the method, the signal representing the digital key is not human readable, for example, the signal is not expressed using a sequence of alpha-numeric or other human-readable characters. Human-readable characters may appear on the physical key article for other purposes, for example, for identification or instructional purposes, but not for the purpose of generating the signal representing the digital key. In addition, or in the alternative, a character string representing the digital key may be imprinted or otherwise displayed on the physical key article to provide an alternative for users preferring to enter the key using a traditional method involving human reading of a character string and then entry of the character string into the computer using a keyboard, microphone, or other user interface device. In such case, the physical key article also includes the representation of the digital key that is not human readable, for inputting the digital key using one of the novel methods disclosed herein.

The method may further include unlocking access to digital content via the computer, or via a second computer that receives the signal represented in the physical key article, in response to receiving the signal. For example, once the user manipulates the key in a defined manner, the user interface may respond to the manipulation by generating the signal. A processor of the computer may compare the signal to a stored secret key, or perform any other suitable key validation operation based on the received signal including, for example, decrypting or attempting to decrypt content that is encrypted using the digital key. In response to determining that the signal comprises a valid representation of a key, the computer may then unlock access to the digital content by outputting the decrypted content, or by otherwise providing access to any content or computing resource for which provision of the digital key by a requesting entity is a necessary condition.

In an aspect of the method, configuring the physical, non-human readable representation of the digital key may further include printing the physical, non-human readable representation onto the physical key article comprising a sheet material, for example, printing an optical code onto a sheet of paper. The physical, non-human readable representation may an optical code suitable for being detected by an optical mouse. In such case, the user interface device may include the optical mouse.

In another aspect of the method, the physical, non-human readable representation comprises a keyboard mask. As used herein, a keyboard mask may include an essentially or substantially planar article, for example, a sheet of paper, that is imprinted or impressed with a pattern of visible marks or impressions representing a sequence of key presses. Boundaries of the mask may align with corresponding boundaries of a keyboard or key pad having a predetermined geometrical configuration. The user interface device may comprise the keyboard or key pad, and may be embodied in any form responsive to pressing or other contact with a portion of the human body, for example, fingers. In an embodiment, the keyboard or key pad may be implemented as a virtual or electronic user interface in a touchscreen device. In an aspect of the method, configuring the physical, non-human readable representation of the digital key may include imprinting a visible mask on a tangible medium, such as printing visible keypress instructions on a sheet of paper. The user may align the keyboard mask over the keyboard for which it is generated, and enter the key by depressing or contacting the keyboard through the mask, following the sequence imprinted on the mask. When such a mask is used, it is not necessary that any human-readable character appear on the keys (e.g., virtual keys on a touchscreen) of the keyboard. Thus, the characters making up the digital key may be kept secret from the person entering the key, by arranging keys on the keyboard in a pattern that is unknown and not visible to the user but that is known to the computer that configures the keyboard mask.

In another aspect of the method, configuring the physical, non-human readable representation of the digital key further comprises providing the physical, non-human readable representation configured as contours in the physical key article. In such case, the user interface device may include a microphone, and the physical key article may enable generating the signal in the form of sound by dragging an object over the contours in the physical key article. For example, a user may drag a pencil over a line of raised bumps in a linearly-shaped key article, causing the signal to be generated as a sequence of taps having predetermined intervals. The computer may receive the signal via a microphone, and decode the digital key from the sequence of taps. In the foregoing example, the physical key article may therefore be understood as including an analog sound recording.

In another aspect of the method, the computer may measure characteristics of the user interface device for use in identifying an authorized user account for the digital content. Physical electro-mechanical devices, for example keyboards or digital mice, typically include characteristics that can be measured and used to create a digital signature for the device. The digital signature may be used to identify a user account for which the digital key is being submitted. Therefore, the single act of generating the signal using the physical key in conjunction which a user interface device having a defined association with a user account may serve the dual purpose of identifying the user account and providing the access key.

In another aspect of the disclosure, a method may similarly include configuring a physical, non-human readable representation of a digital key in a non-readable portion of a computer-readable recording medium. The input device may comprise a reading device capable of reading a computer-readable medium, for example, an optical disc reader or driver for an electronic memory device such as a Universal Serial Bus (USB) memory device. The method may further include unlocking access to digital content via the computer in response to receiving the signal representing a digital key from an input device in communication with the computer, wherein the signal is not human readable.

In an aspect of the method, the non-readable portion of the computer-readable recording medium may include defined sectors with predetermined errors. The signal may be encoded in an arrangement of the defined sectors and/or predetermined errors. For example, an optical disc may be encoded with protected (e.g., encrypted) content, wherein the predetermined errors in defined sectors are present in the optical disc. The software may include an installation/access and decryption application requiring a key. When the optical disc is inserted into a disc reading device, the installation/access application may determine whether or not the predetermined errors are present in the defined sectors, including decoding a key from the error pattern it detects on the disc and validating the detected key. If the installation/access software detects the defined error pattern, it may decrypt protected content (which may include software) on the disc using the decoded key. Unauthorized copies of the protected content will not have include the key encoded in the error pattern, and thus will not be usable.

In an aspect of the method, the computer-readable recording medium may have different portions of the digital key written to the defined sectors, wherein the defined sectors are characterized by write errors preventing further recording of data. The method may further include writing mask data to the recording medium to mask the portions of the digital key by placing other data in writable sectors. The method may further include extracting the digital key from the recording medium by identifying the defined sectors using the mask data.

In related aspects, a computing apparatus (e.g., personal computer or smart phone) may be provided for performing any of the methods and related aspects of the methods summarized above. An apparatus may include, for example, a processor coupled to a memory, wherein the memory holds instructions for execution by the processor to cause the apparatus to perform operations as described above. Similarly, an article of manufacture may be provided, including a non-transient computer-readable storage medium holding encoded instructions, which when executed by a processor, cause a computing apparatus to perform the methods and implement aspects of the methods as summarized above.

A more complete understanding of the method and apparatus for security key entry, and other aspects, will be afforded to those skilled in the art, as well as a realization of additional advantages and objects thereof, by a consideration of the following detailed description of the preferred embodiment. Reference will be made to the appended sheets of drawings which will first be described briefly.

DETAILED DESCRIPTION

The present disclosure describes alternative serial number input methods that make the serial number imperceptible to a human exercising his five senses, and avoid problems as discussed above. In the following examples, a "serial number" may be generally understood as include any form of digital key, whether or not using numeric or alpha-numeric characters. The methods take advantage of the fact that modern computers may often be equipped with input methods other than the keyboard. These methods may include a traditional "mouse", a laser "mouse", a camera, a microphone, speakers that are capable of acting as a microphone (with appropriate direct hardware access), a "touchpad", a fingerprint reader, and a touch-sensitive screen. By way of example, the serial number may be used for activating an intellectual property license, for example, during a software installation process, or during installation of other intellectual property such as music or video. In addition, the serial number identification methods may be used to uniquely identify a user, or at least to identify a user as in possession of a copy of the serial number device. In some embodiments, for example the case of the laser mouse method described below, defects or unique characteristics of the reading device are such that the defects, in combination with the serial number, may uniquely identify the user. This is explored further in conjunction with the laser mouse but applies with equal force to other methods capable of unique variation or defect.

One innovation that is useful in this context is the repurposing of a laser-mouse as a bar code reader. A laser mouse capable of reading the strength of the return signal is used in conjunction with software that interprets the strength of the return signal to determine whether the mouse is passing over a black (or dark) portion of the bar code or over the white gap, and when passed over a bar code the mouse/software combination may be used to read the bar code.

In addition (or instead of) the traditional printed serial number, the serial number is encoded in one or more of several alternative forms. The serial number may be entered, and recognized by the computer, by using this alternative method. In an implementation, the serial number entry by alternative method is adequate to fully transmit the serial number and actuate the installation and/or license. In an alternative implementation, some additional information is required from the user; for example, entry of a printed four digit or other short PIN. Alternative serial number or key entry methods are described Use of a Printed Form A printed form may be used to cause a laser-based mouse to generate a signal in which the serial number or key is encoded by movement over the form. For example, portions of the printed form may be functionally perfectly reflective, or as close as feasible, while others may be functionally perfectly non-reflective, or as close as feasible. When the user moves the mouse over the pattern, the laser light return therefore varies in response to chances in reflectivity. In the alternative, for a mouse not capable of transmitting the strength of the laser light reflection, the cursor may start and stop, and the start and stop pattern may convey the serial number. In both cases, the printed form functions as a transmissive mouse pad cover, which transmits the serial number to a special application operating on the connected computer. The application should be developed to accommodate defects or variations in mouse functions compared to other manufacturing samples of the same mouse (or different mouse brands), such that variations do not prevent the serial number from being corrected input using the mouse. For example, the serial number may be printed in a large enough pattern to reliably be read by nearly all laser-mouse devices.

Variations in performance of computer mice or other user interface devices may be perceptible by the input software which may record the variations as a device "fingerprint." This unique fingerprint may be enhanced by use of an intermediate marking on the paper that is only partially reflective. The software may thus report that the serial number is (using dots, since DPI is a measurement used by mouse devices) 35 dots (the reflective area), halt in movement (the non-reflective area), 25 dots, halt in movement, etc. By bracketing the dots (i.e. anything between 1-10 is "A", 11-20 is "B", 21-30 is "C", 31-40 is "D", etc, the serial number may be "DE" in this example. However, this mouse, in some cases in combination with the speed and force with which the user operates it, might report "35 blank 25", while another mouse reports "37 blank 28"—both generate the same serial number, but the precise measurement (also preferably with a smaller bracketing mechanism to account for variation in performance) provides further unique identification of the mouse device. One implementation may be to utilize a graduated darkness marking on the surface, so that, for example, a two inch line starts at 100% white, is gray at one inch, and 100% black at two inches. Depending on the specifications and variation therefrom of the mouse, the mouse may begin to show movement at a slightly different point when passing over the graduated line. By putting a marking at the start of the two inch line that causes mouse movement and a marking at the end that stops it, when a user passes the mouse over the line, movement may stop then restart then stop again in a pattern uniquely queued to the particular characteristics of that mouse.

Use of a Camera or Scanner

A web camera, scanner, photograph imported from a standalone camera, or other visual input device may be used to read the bar code or to read the serial number directly. Preferably the bar code may be a 2-dimensional (2D) or 3-dimensional (3D) bar code, but may also include alpha-numeric characters that may be read using OCR techniques. Variations in the characteristics of the visual input device (including, where available, EXIF or other metadata) may be used to provide unique identification of the device. Patterns of dead or hot pixels in a display screen of a user interface device, for example a touchscreen device, may also be used for unique identification.

Use of a Keyboard Mask

To permit utilization of a keyboard, a printed (likely plastic) sheet with raised bumps sufficient to actuate the keys on a keyboard (or to actuate receptors on a touch screen) may be used. The sheet may be sized for a target keyboard size (i.e. "Standard", "Lenovo standard laptop" etc) and the software marketed to users with different sheet sizes, or different sheet sizes included to accommodate different keyboard sizes. However, in an implementation, a single sheet designed to be small enough to actuate some combination of keys on nearly all keyboards may be used. In an implementation, the sheet may be tested with all keyboard sizes, the software may determine the keyboard size (either from a measurement metric included in the sheet by reading information that the operating system reports about the computer and/or keyboard type). The serial number may then be generated by using the pattern of keys pressed for that determined keyboard size. In another preferred implementation, the serial input software may look for a pattern of key presses. Thus, for example, a sheet might have a layout of a 3×3 rectangle and a serial number of 1-1-0-0-0-1. If keys are pressed in the upper left, upper middle, and lower right segments of the keyboard, the pattern may be read without requiring any particular keys be pressed (but only a particular pattern of keys, in which in one implementation, even multiple keys in the same segment may count as a single keypress). The sheet may be convex and rolled across the keyboard, so that keyboards incapable of reporting multiple simultaneous keypresses may be utilized. Anchor keys may also be used to calibrate the device, for example, using a bump in the upper and lower right and left segments. In addition to a convex sheet, a sheet with a moving actuator may be used (i.e. a lever pulled along the sheet that extrudes the bump when the lever passes the bump. Multiple sheets may be used to enhance the number of data bits available for use.

Figure 1:
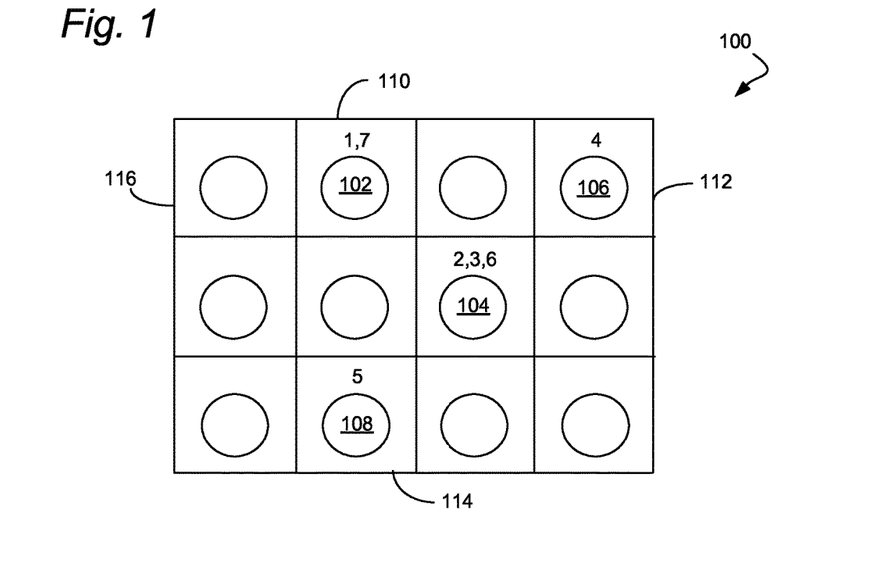
FIG. 1 is a schematic diagram showing an example of a keyboard mask.

In an embodiment, an essentially flat keyboard mask 100 may be used with a touchscreen input device displaying a virtual key pad, as shown in FIG. 1. The keyboard mask 100 may include a numeric sequence associated with keypress locations (e.g., 102, 104, 106, 108) located on the mask 100. The keypress locations may be visually indicated on the mask 100 using printed shapes, or for use with a capacitive touchscreen, cutouts. The mask 100 may be electrically conductive to permit use with a capacitive touchscreen, if the keypress locations are not indicated using cutouts. The sequence of key presses may be indicated using numerals associated with respective keypress locations, for example as shown in FIG. 1. For example, the depicted mask 100 indicates a keypress sequence of 102, 104, 104, 106, 108, 104, 102.

To enable key entry using the mask 100, the computer may display a virtual keyboard having boundaries or alignment marks for aligning with corresponding boundaries 110, 112, 114, 116 of the mask 100. The virtual keyboard may, or may not, indicate any characters on or associated with its keys, or may indicate incorrect characters. If the virtual keys lack any indication of characters or indicate incorrect characters that do not actually correspond to the character value of the key, the key entered using the keyboard mask may be kept secret from the person using the mask.

Use of a Contoured or Indented Article

Figure 2:
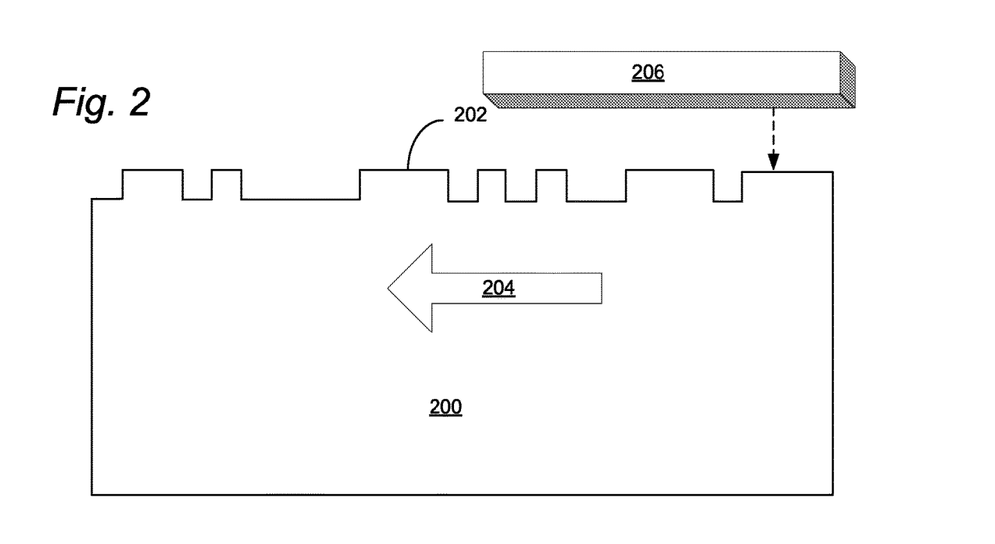
FIG. 2 is a schematic diagram showing an example of a physical key using a contoured surface for generating a sound representing a key

In another implementation, a paper or sheet with raised bumps, or another substrate 200 with an uneven or contoured surface 202 (and/or with uneven subsurface characteristics) may be provided as a physical key, as shown in FIG. 2. The contoured surface 202 may be located at the bottom of a groove (not shown). A stick, the end of a pen, a key, a provided plastic or similar device, or other device capable of making sound when dragged across the sheet is pulled across the article 200 and the microphone (or, in the case where no microphone is available and where speakers can be accessed and utilized to read sound, the speakers) picks up the sound and decodes the pattern of sound (e.g., taps, clicks and/or scratches) into which the serial number is encoded. An arrow 204 or other indicator may show the user the direction in which the stick or similar object should be moved across the surface 202.

Unique characteristics of the user, such as speed with which the user passes a stick 206, cylindrical rod or similar object over the surface, hand size (which may variably muffle the sound generated by the device, or at least that portion transmitted up the stick), the acoustic characteristics of the room, and the characteristics of the microphone may all provide additional data (within the larger bracket used to read the serial number) that may uniquely identify the user. In an implementation, the stick provided with the serial number may have defined identifying characteristics, such as a randomly assigned length, width, and/or ratio of component elements that may alter the tonal characteristics of the sound. Such alteration may be used to verify that the user is in possession of the original stick that came with the original packaging, which information may be used to verify upgrade eligibility for example. Indeed, the packaging itself may be used (i.e. "use the corner of the CD case to scratch the sheet"), where the packaging has unique characteristics that can be used to verify physical possession of the packaging. Note that the generation of sound in this method is similar to that used by a phonograph, or the sound generated by dragging a needed across a phonograph record.

In another aspect, the generated sound may be used to upgrade from an analog media to a digital media. In an implementation, the microphone on the computer reads the unique sound generated by a needle being dragged horizontally (not circularly) across the surface of a vinyl record, thus simultaneously scratching the record and verifying ownership of the record. The user may then be permitted to download the digital version at a reduced price but is unable to resell the record to other users. No turntable is required to utilize this method, making it attractive to users with record collections but no turntables. Another method is scanning the record using a photograph or a flatbed scanner, and generating an audio signal using a virtual needle on a scanned image of a record. This data may be used to verify possession of the LP and thus eligibility to upgrade. In another implementation, the required sound to upgrade is such that it may be generated without using a sharp object and/or without using sufficient force to scratch the record. In this case, the sound may be generating by pulling the device horizontally or circularly around the record.

In another implementation, existing software may be upgraded by purchasing a new bar code or a new tool to alter the sound.

With all of these implementations, periodic re-entry or re-verification of the bar code is possible ("bar code" or "serial number" are used herein to refer generally to unique identification numbers permitting installation or use of licensed materials).

Use of a Capacitive Reader

A device with capacitive or other characteristics similar to that of human flesh may be used to enter serial numbers using fingerprint readers such as those built into many Lenovo laptops.

Use of an Indented Sheet

A sheet with bumps on it may be placed over a touchpad, such as those present on laptops. A pressing device, such as a finger, pen end, or supplied plastic device, is pulled across the sheet, and the bumps are read and converted into a serial number. The previous discussion of bracketing and unique device identification applies here as well.

Verifying Upgrade Eligibility

Note that with many of these methods, the unique device identification can be used to verify upgrade eligibility, or to verify eligibility for up-sells, or co-sells. For many of the devices, the unique characteristics can be read using any similar bar code sheet, not just the particular sheet used the first time. For example, a dot located at a designated position in both sheets should generate the same variability.

Use of Defined Errors in Computer-Readable Media

In some embodiments, the bar code or any other data may be embedded in a writable disc (such as a DVD-R) or other computer-readable storage medium in the form of unwritable sectors. The unwritable sectors may generate write errors, read errors, or may appear to write properly but return predetermined data. For use in serial number entry, the disc is placed in the disc reader/writer and the software writes to the disc. In writing to the disc, it may read the serial number by identifying the pattern of read, write, or verify errors. In an implementation, the errors may be verify errors, so that the software is written to the disc but when the data is read back, some of the data does not match what was originally written. The non-matching data may be derived from the unwritable sectors, and may represent the serial number. Subsequent attempts to read the serial number from the disc will fail, since (a) the disc is no longer writable in the area already written to, and (b) there is no way to tell what sectors contained the serial numbers without having a copy of the data that was attempted to be written to the disc.

To illustrate, if the 1st, 3rd, 5th, and 7th sectors be unwritable and contain the serial number "GARY", the software might write "FIAF9EFF" On write, only the 2nd, 4th, 6th, and 8th sectors may be successfully written, writing _ I_F_E_F. On verify, it may read "GIAFREYF", and by identifying the sectors that failed to verify, it may know the serial number was "GARY". Subsequent users may not know which sectors had failed to verify, and may thus have to try all possible combinations of "GIAFREYF" to determine the serial number. With a sufficiently long serial number (for example, thousands of characters long) it may be impossible to crack without quantum computers or other currently unavailable technology. In an implementation, each disc may be equipped with numerous areas each containing serial numbers. To move the software to a new computer, the software may be deactivated, part but not all of the old serial number written to a USB stick or similar device (and/or the serial number deactivated, in the case of internet-connected installations/deinstallations), and the new installation may require that portion of the key, verify it against the old written portion of the disc, then permitted use of the next serial number on the disc.

System Overview

Figure 3:
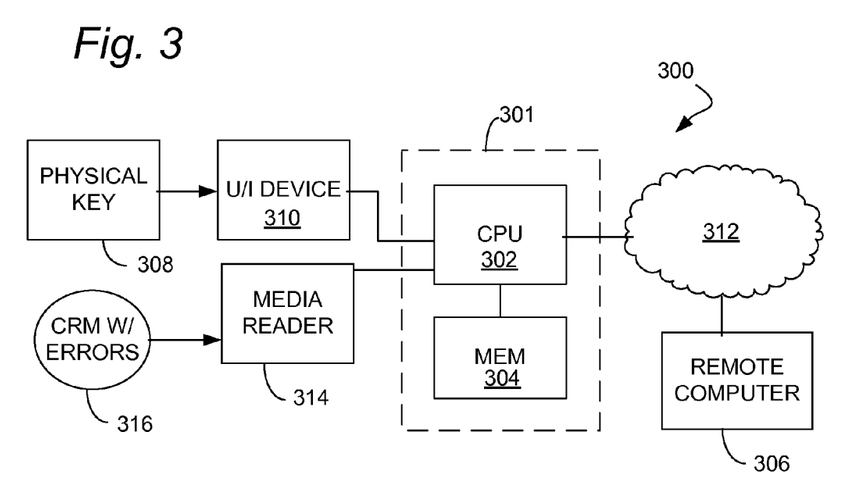
FIG. 3 is a block diagram illustrating an example of a system and apparatus for key entry using one or more novel methods disclosed herein.

FIG. 3 show a system 300 that may be used to practice various aspects of the methods disclosed herein. The system 300 may include one or more computers 301, 306, which may perform aspects including key configuration, decoding of a key from a signal generated using a physical key article, validating the key, and unlocking access to content using the key. The computer 301 may be a client-side device, which may be in communication with another computer 306 via a network 312. The computer 301 and computer 306 may each comprise a processor 302 coupled to a memory 304 hold program instructions and data. A user interface device 310, for example, a microphone, optical mouse, camera, keyboard, touchscreen or other device as described herein may be coupled to the computer 301. A user may manipulate a physical key 308 relative to the user interface device 310 to produce a signal from which a key, serial number, or other predetermined information can be decoded by the computer 301.

In the alternative, or in addition, a computer-readable media reader 314 may be coupled to the computer 301. Key data may be encoded in a corresponding computer-readable medium 316, for example, in an optical disc medium or memory device, using a error pattern as described above.

Figure 4:
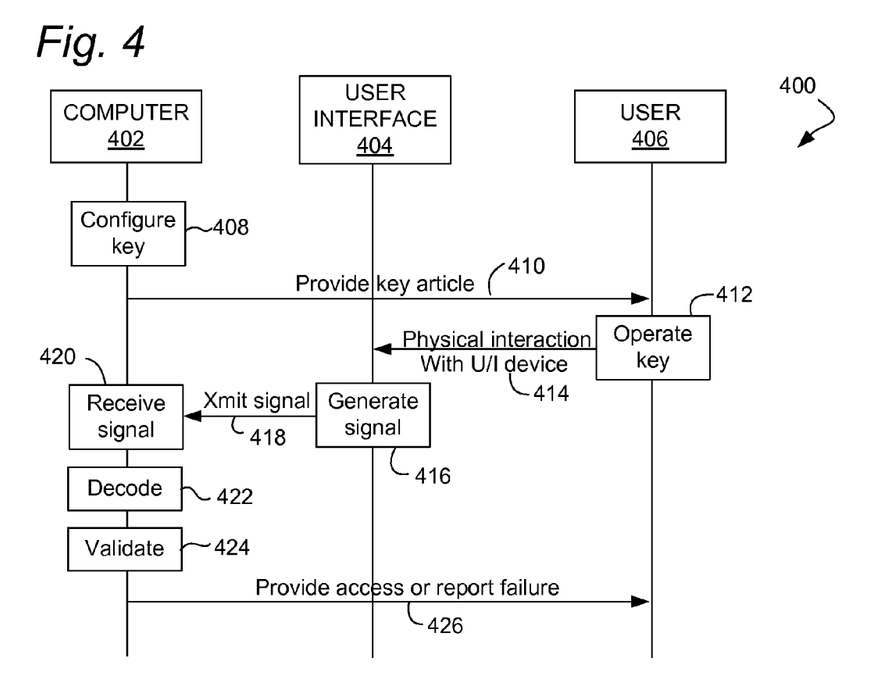
FIGS. 4-5 are call diagrams illustrating aspects of the novel methods disclosed herein in relation to examples of selected system elements.

FIG. 4 illustrates a call flow 400 and methods for enabling entry of a digital key into a computer 402 by a user 406 manipulating a physical key with a user interface device 404. The methods may include configuring 408 a physical, non-human readable representation of a digital key in a physical key article. The physical key article may be configured so as to enable the person 406 to generate a signal representing the digital key from the user interface device 404 in communication with the computer 402 by physical manipulation 412 of the key article, which may include a physical interaction 414 with the user interface device 404. The computer 402 performing the key configuration 408 may be the same as, or different from, a computer later performing operations such as receiving the signal 420 and subsequent operations. In general, it should be understood that computing functions may be distributed across any desired number of computers where doing so would not be detrimental to performance of the desired function. The user interface device 404 may generate a signal 416 encoding the digital key in response to the physical interaction 414 using the key article. The computer 402 may receive the signal 420. The computer 402, or another computer, may decode a key from the signal 422 and determine (validate) 424 whether or not the key is valid, using any suitable validation method.

In an aspect of the methods, the signal representing the digital key is not human readable, for example, the signal is not expressed using a sequence of alpha-numeric or other human-readable characters. Human-readable characters may appear on the physical key article for other purposes, for example, for identification or instructional purposes, but not for the purpose of generating the signal representing the digital key. In addition, or in the alternative, a character string representing the digital key may be imprinted or otherwise displayed on the physical key article to provide an alternative for users preferring to enter the key using a traditional method involving human reading of a character string and then entry of the character string into the computer using a keyboard, microphone, or other user interface device. In such case, the physical key article also includes the representation of the digital key that is not human readable, for inputting the digital key using one of the novel methods disclosed herein.

The methods may further include unlocking access 426 to digital content via the computer 402, or via another computer that receives the signal represented in the physical key article, in response to receiving the signal. For example, once the user manipulates the key in a defined manner, the user interface 404 may respond to the manipulation by generating the signal 416. A processor of the computer may compare the signal to a stored secret key, or perform any other suitable key validation operation based on the received signal including, for example, decrypting or attempting to decrypt content that is encrypted using the digital key. In response to determining that the signal comprises a valid representation of a key, the computer may then unlock access to the digital content by outputting the decrypted content, or by otherwise providing access to any content or computing resource for which provision of the digital key by a requesting entity is a necessary condition.

In an aspect of the method, configuring 408 the physical, non-human readable representation of the digital key may further include printing the physical, non-human readable representation onto the physical key article comprising a sheet material, for example, printing an optical code onto a sheet of paper. The physical, non-human readable representation may an optical code suitable for being detected by an optical mouse. In such case, the user interface device may include the optical mouse.

In another aspect of the method, the physical, non-human readable representation comprises a keyboard mask as described hereinabove. In another aspect of the method, configuring the physical, non-human readable representation of the digital key further comprises providing the physical, non-human readable representation configured as contours in the physical key article, as described hereinabove. In another aspect of the method, the computer may measure characteristics of the user interface device for use in identifying an authorized user account for the digital content, as described hereinabove.

Figure 5:
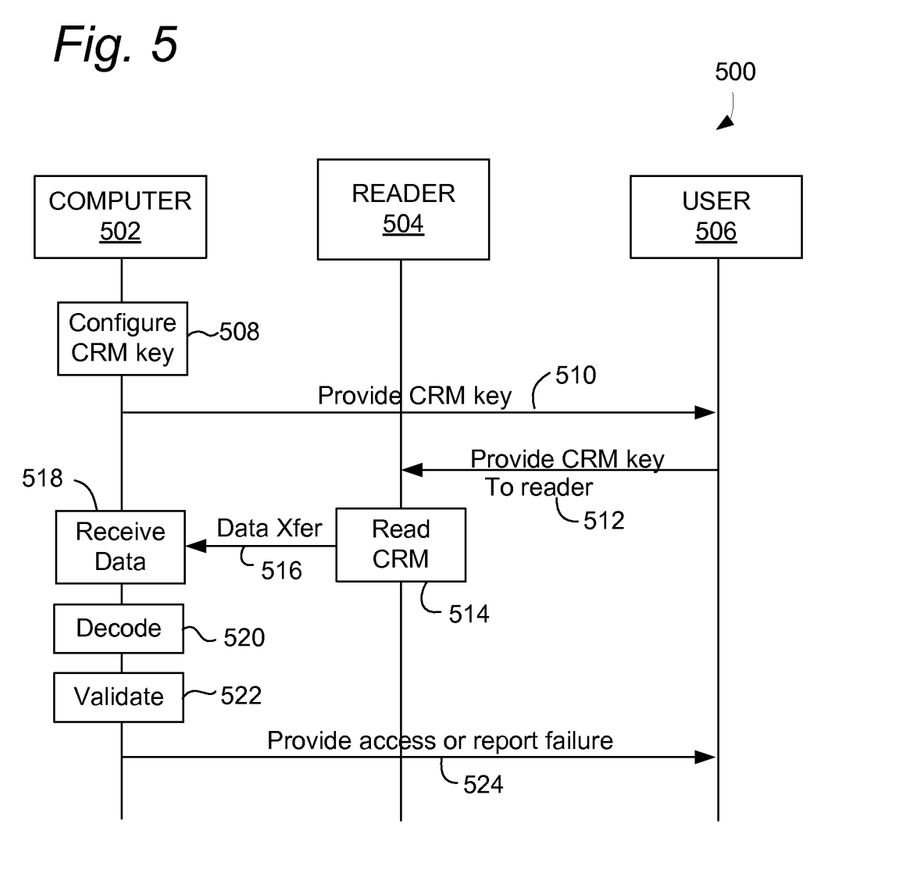

FIG. 5 shows a call flow 500 or methods for encoding or using a digital key into a computer 502 by a user 506 using a computer-readable medium (CRM) and a CRM reader device 504. The methods may include configuring 508 a non-human readable representation of a digital key in an error pattern of a CRM. The CRM with error pattern may be configured so as to enable the person 506 to generate a data signal 516 representing the digital key from the CRM reader device 504 in communication with the computer 502 by providing the CRM 512 to the CRM reader 504, which may read the CRM 514 in a convention manner. The computer 502 performing the key configuration 508 may be the same as, or different from, a computer later performing operations such as receiving the data 518 and subsequent operations. The CRM may be provided 510 to an end user 506, for example by a physical shipment, store purchase or electronic transfer (if the medium receiving the transfer has the predetermined error pattern. The methods may include configuring 508 a tangible non-human readable representation of a digital key in a non-readable portion of a computer-readable recording medium. The input device 504 may comprise a reading device capable of reading a computer-readable medium, for example, an optical disc reader or driver for an electronic memory device such as a Universal Serial Bus (USB) memory device. The method may further include unlocking access 524 to digital content via the computer in response to receiving the data signal 518 representing a digital key from an input device 504 in communication with the computer 502, wherein the signal is not human readable. For example, the methods may include decoding 520 a key using techniques as described herein above, and validating the decoded key using any suitable method 522. The computer 502, or another computer, may provide access or report failure 524 to the user, for example by decrypting content encoded on the CRM using the key.

In an aspect of the methods, the non-readable portion of the computer-readable recording medium may include defined sectors with predetermined errors. The signal may be encoded in an arrangement of the defined sectors and/or predetermined errors. For example, an optical disc may be encoded with protected (e.g., encrypted) content, wherein the predetermined errors in defined sectors are present in the optical disc. The software may include an installation/access and decryption application requiring a key. When the optical disc is inserted into a disc reading device, the installation/access application may determine whether or not the predetermined errors are present in the defined sectors, including decoding a key from the error pattern it detects on the disc and validating the detected key. If the installation/access software detects the defined error pattern, it may decrypt protected content (which may include software) on the disc using the decoded key. Unauthorized copies of the protected content will not have include the key encoded in the error pattern, and thus will not be usable.

In an aspect of the method, the computer-readable recording medium may have different portions of the digital key written to the defined sectors, wherein the defined sectors are characterized by write errors preventing further recording of data. The method may further include writing mask data to the recording medium to mask the portions of the digital key by placing other data in writable sectors. The method may further include extracting the digital key from the recording medium by identifying the defined sectors using the mask data.

The methods described herein may generally be implemented using one or more computers having at least one port for connecting to a user interface device or CRM reader providing a machine-readable signal, using program instructions encoding in a computer-readable storage medium or the like. When executed by a processor of the one or more computers, the instructions may cause the one or more computers to perform the described operations. The methods may further include one or more operations performed by a human operator to generate the machine-readable signal by performing a physical action on a token, as described herein.

The invention claimed is:

1. A method, comprising:
   encoding portions of a digital key in at least two non-contiguous, non-writable sectors of a recording medium;
   writing mask data to the recording medium utilizing a computer to mask the portions of the digital key in the non-writable sectors by placing other data in writable sectors;
   verifying the written mask data utilizing a computer to identify non-verified sectors having data that does not match the mask data; and
   reconstructing the digital key by extracting the portions of the digital key from the non-verified sectors.

2. The method of claim 1, wherein the digital key is a fixed character string operative as a security key capable of unlocking access to a digital resource secured thereby.

3. The method of claim 2, wherein the security key is utilized to unlock access to the digital resource.

4. The method of claim 1, wherein the recording medium is a write-once medium.

5. The method of claim 1, wherein the recording medium is a rewritable medium.

6. The method of claim 1, wherein the digital key is not human-readable.

7. The method of claim 1, wherein the recording medium is not human-readable.

8. A method, comprising
   encoding a digital key as data in at least one non-writable sector of a computer-writable recording medium;

writing mask data to the recording medium utilizing a computer to mask the digital key by placing other data in writable sectors;

verifying the written mask data utilizing the computer to identify at least one non-verified sector having data that does not match the mask data; and reading the digital key data from the at least one non-verified sector.

9. The method of claim 8, wherein the at least one non-writable portion of the computer-writable recording medium comprises at least two non-contiguous portions of the recording medium.

10. The apparatus of claim 8, wherein the at least one non-writable portion comprises two non-contiguous portions.

11. The method of claim 8, wherein the recording medium is further configured to generate write errors preventing further recording of data.

12. The method of claim 8, wherein the recording medium is a rewritable medium.

13. The method of claim 8, wherein the mask data enables an input device to identify defined sectors having write errors.

14. The method of claim 8, wherein the digital key is non-human-readable.

15. The apparatus of claim 8, wherein the recording medium is a write-once medium.

16. A method, comprising:

configuring a physical, non-human readable representation of digital key by encoding portions of the digital key in at least two non-contiguous sectors of a computer-readable recording medium, wherein the non-contiguous sectors are non-writable sectors separated by writable sectors having other data written therein;

reading the recording medium utilizing a computer;

identifying sectors containing the digital key; and reconstructing the digital key from data contained within the at least two non-contiguous sectors.

17. The method of claim 16, wherein the computer-readable recording medium is computer-writable.

18. The method of claim 16, wherein the physical, non-human readable representation comprises an optical code configured to be detected by an optical mouse.

19. The method of claim 16, wherein the physical, non-human readable representation comprises a keyboard mask.

20. The method of claim 16, wherein the configuring comprises providing the physical, non-human readable representation imprinted on a tangible medium.

* * * * *